(12) United States Patent
Kierat et al.

(10) Patent No.: US 10,781,353 B2
(45) Date of Patent: Sep. 22, 2020

(54) USE OF A COMPOSITION FOR STABILIZING A GEOLOGICAL FORMATION IN OIL FIELDS, GAS FIELDS, WATER PUMPING FIELDS, MINING OR TUNNEL CONSTRUCTIONS

(71) Applicant: BASF SE, Ludwigshafen (DE)

(72) Inventors: Radoslaw Kierat, Altenmarkt (DE); Bernhard Feichtenschlager, Traunstein (DE); Julia Göschel, Bremen (DE); Hendrik Wagner, Bielefeld (DE)

(73) Assignee: BASF SE (DE)

( * ) Notice: Subject to any disclaimer, the term of this patent is extended or adjusted under 35 U.S.C. 154(b) by 40 days.

(21) Appl. No.: 15/576,967

(22) PCT Filed: May 13, 2016

(86) PCT No.: PCT/EP2016/060834
§ 371 (c)(1),
(2) Date: Nov. 27, 2017

(87) PCT Pub. No.: WO2016/188774
PCT Pub. Date: Dec. 1, 2016

(65) Prior Publication Data
US 2018/0148624 A1    May 31, 2018

(30) Foreign Application Priority Data
May 27, 2015    (EP) .................................... 15169333

(51) Int. Cl.
*E21B 33/138*    (2006.01)
*C09K 8/035*    (2006.01)
(Continued)

(52) U.S. Cl.
CPC ............ *C09K 8/035* (2013.01); *C04B 14/368* (2013.01); *C04B 26/14* (2013.01); *C04B 26/16* (2013.01);
(Continued)

(58) Field of Classification Search
None
See application file for complete search history.

(56) References Cited

U.S. PATENT DOCUMENTS 3,758,646 A * 9/1973 Boyer ..................... C07C 41/30
558/188
3,883,571 A  5/1975 Allport et al.
(Continued)

FOREIGN PATENT DOCUMENTS

EA    016919 B1    8/2012
RU    2527099 C2    8/2014
(Continued)

OTHER PUBLICATIONS

Extended European Search Report for EP Patent Application No. 15169333.0, dated Jan. 12, 2017.
(Continued)

*Primary Examiner* — Angela M DiTrani Leff
*Assistant Examiner* — Charles R Nold
(74) *Attorney, Agent, or Firm* — Faegre Drinker Biddle & Reath LLP (57) ABSTRACT

The present invention relates to the use of a composition for stabilizing a geological formation in oil fields, gas fields, water pumping fields, mining or tunnel constructions. The composition has a hardening temperature in the range from about 40° C. to about 120° C. and can therefore be used to stabilize a geological formation in oil fields, gas fields, water pumping fields as well as in mining or tunnel constructions.

20 Claims, 2 Drawing Sheets

(51) Int. Cl.

| | |
|---|---|
| *C04B 26/14* | (2006.01) |
| *C04B 26/16* | (2006.01) |
| *C08G 18/10* | (2006.01) |
| *C08G 18/30* | (2006.01) |
| *C08G 18/36* | (2006.01) |
| *C09K 8/44* | (2006.01) |
| *C08G 18/22* | (2006.01) |
| *C08G 18/79* | (2006.01) |
| *E02D 37/00* | (2006.01) |
| *C09J 175/04* | (2006.01) |
| *C08G 59/68* | (2006.01) |
| *C09K 8/58* | (2006.01) |
| *C09K 8/00* | (2006.01) |
| *C08G 18/42* | (2006.01) |
| *C08G 18/80* | (2006.01) |
| *C08G 18/00* | (2006.01) |
| *C09K 3/22* | (2006.01) |
| *C08L 63/00* | (2006.01) |
| *C09K 17/30* | (2006.01) |
| *C08G 18/48* | (2006.01) |
| *C09K 17/00* | (2006.01) |
| *C04B 14/36* | (2006.01) |
| *C08G 18/58* | (2006.01) |
| *C08G 18/64* | (2006.01) |
| *C08G 18/76* | (2006.01) |
| *C09K 8/588* | (2006.01) |
| *E21B 21/00* | (2006.01) |
| *E21D 9/00* | (2006.01) |
| *C04B 111/00* | (2006.01) |
| *E21B 43/16* | (2006.01) |

(52) U.S. Cl.
CPC .......... *C08G 18/003* (2013.01); *C08G 18/10* (2013.01); *C08G 18/225* (2013.01); *C08G 18/30* (2013.01); *C08G 18/36* (2013.01); *C08G 18/4236* (2013.01); *C08G 18/4829* (2013.01); *C08G 18/58* (2013.01); *C08G 18/64* (2013.01); *C08G 18/7671* (2013.01); *C08G 18/797* (2013.01); *C08G 18/8064* (2013.01); *C08G 59/68* (2013.01); *C08L 63/00* (2013.01); *C09J 175/04* (2013.01); *C09K 3/22* (2013.01); *C09K 8/00* (2013.01); *C09K 8/44* (2013.01); *C09K 8/58* (2013.01); *C09K 8/588* (2013.01); *C09K 17/00* (2013.01); *C09K 17/30* (2013.01); *E02D 37/00* (2013.01); *E21B 21/003* (2013.01); *E21B 33/138* (2013.01); *E21D 9/002* (2013.01); *C04B 2111/00724* (2013.01); *C08G 2190/00* (2013.01); *E21B 43/16* (2013.01)

(56) References Cited

U.S. PATENT DOCUMENTS

| | | | |
|---|---|---|---|
| 4,229,347 | A | 10/1980 | Holt et al. |
| 4,292,214 | A | 9/1981 | Blount |
| 4,669,919 | A | 6/1987 | Hilterhaus et al. |
| 4,698,408 | A | 10/1987 | Goel et al. |
| 5,326,833 | A | 7/1994 | Parodi et al. |
| 5,789,455 | A * | 8/1998 | Kitamura ............... C08G 18/14 521/113 |
| 6,309,507 | B1 * | 10/2001 | Morikawa .............. C08G 18/10 156/331.4 |
| 6,668,927 | B1 * | 12/2003 | Chatterji .................. C09K 8/40 166/291 |
| 8,465,840 | B2 | 6/2013 | Fader |
| 8,997,867 | B2 | 4/2015 | Leleux et al. |
| 9,278,889 | B2 | 3/2016 | Rayner et al. |
| 2005/0061509 | A1 * | 3/2005 | Nguyen ................ C09K 8/508 166/307 |
| 2007/0093566 | A1 | 4/2007 | Thompson-Colon et al. |
| 2010/0087566 | A1 | 4/2010 | Ballard |
| 2012/0245280 | A1 * | 9/2012 | Tsudo .................... C08G 18/12 524/590 |
| 2013/0303694 | A1 | 11/2013 | Debien et al. |
| 2014/0371406 | A1 | 12/2014 | Esbelin et al. |
| 2017/0267806 | A1 | 9/2017 | Goeschel et al. |

FOREIGN PATENT DOCUMENTS

| | | |
|---|---|---|
| SU | 1493116 A3 | 7/1989 |
| WO | WO-200210250 A1 | 2/2002 |
| WO | WO-2009115540 A2 | 9/2009 |
| WO | WO-2010121898 A1 | 10/2010 |
| WO | WO-2011107367 A1 | 9/2011 |
| WO | WO-2012103965 A1 | 8/2012 |
| WO | WO-2013098034 A1 | 7/2013 |
| WO | WO-2013110512 A1 | 8/2013 |
| WO | WO-2013127647 A1 | 9/2013 |
| WO | WO-2013143841 A1 | 10/2013 |
| WO | WO-2014096349 A1 | 6/2014 |

OTHER PUBLICATIONS

Partial European Search Report for EP Patent Application No. 15169333.0, dated Sep. 8, 2015.
Partial Search Report and Written Opinion for PCT Patent Application No. PCT/EP2016/060834, dated Jun. 9, 2016.
International Search Report for PCT/EP2016/060834 dated Jul. 1, 2016.
Written Opinion of the International Searching Authority for PCT/EP2016/060834 dated Jul. 1, 2016.

* cited by examiner

USE OF A COMPOSITION FOR STABILIZING A GEOLOGICAL FORMATION IN OIL FIELDS, GAS FIELDS, WATER PUMPING FIELDS, MINING OR TUNNEL CONSTRUCTIONS

CROSS-REFERENCE TO RELATED APPLICATIONS

This application is a national stage application (under 35 U.S.C. § 371) of PCT/EP2016/060834, filed May 13, 2016, which claims benefit of European Application No. EP15169333.0, filed May 27, 2015, both of which are incorporated herein by reference in their entirety.

The present invention relates to the use of a composition for stabilizing a geological formation in oil fields, gas fields, water pumping fields, mining or tunnel constructions.

Over the past decades, the oil and gas industry has made great progress in developing drilling technologies to make well constructions more cost effective and safe. Inter alia, wellbore stabilizing materials have been developed to avoid or at least minimize problems encountered while drilling. These problems include lost circulation, stuck pipe or hole collapse.

Wellbore stabilizing materials such as cements have the common goal to improve the integrity of the wellbore and to prevent lost circulation. However, cement compositions and other materials comprising fibers and solid particulates are still not satisfactory. In particular, long-term stability of wellbores conferred by common materials is not yet sufficient, and loss of well control resulting in loss of production still occurs with prior art tools. Moreover, none of the prior art wellbore strengthening materials is suitable for all of the different geological formations including clay, sandstone, siltstone and sand at once. A particular problem arises, when changes occur in the geological formation, for example in oil, gas or water production. In particular, pressure fluctuations within the formation surrounding the wellbore may overburden the mechanical properties including bending tensile strength of common wellbore strengthening materials. The stability of prior art materials is further challenged by an insufficient resistance to chemicals and water. In situations where the strengthening material isolates the wellbore from the surrounding geological formations, this can be particularly troublesome, because initial defects can usually not be detected early enough to prevent progression without much effort. A further challenge results from the time required to apply the wellbore strengthening material. In particular, materials that set too early are not suitable for strengthening wellbores in the exploration and/or recovery of oil, gas or water. This is because providing the material to deeper areas of the wellbore often takes too much time, and the material would start to harden before it arrives at the target location.

When drilling for oil, water, gas etc. and progressing to deeper areas in the geological formation, the temperature in the borehole increases, for example to 80 to 100° C. and even higher temperatures. For said areas of higher temperature in geological formations prior art stabilizing materials do not provide a suitable pot life, wherein the material remains processible (pumpable or injectable) at about 80 to 100° C.

Attempts to retard the hardening of polymeric materials have been made for certain polyurethane systems. EP 2 257 580 describes the use of acid-blocked amine catalysts in polyurethane systems for the production auf sandwich components. However, the pot life of the polyurethane material has only been elongated for minutes. An elongation for hours is required for use in stabilizing wellbores.

WO 2010/121898 describes a polyisocyanate composition, comprising polyisocyanate, a lithium halide and an urea compound. WO 2012/103965 describes an epoxy resin composition comprising an epoxy resin, a monool or a polyol and a carboxamide compound. WO 2013/098034 describes a composition comprising a polyisocyanate composition comprising a compound having an imide structure —CO—NH—CO—, a lithium halide, a urea compound and an epoxy resin. WO 2013/143841 describes a trimerization catalyst composition comprising an alkali or alkaline earth metal salt in combination with compounds having carboxamide groups or in combination with compounds having the structural unit —CO—NH—CO—. The compositions of said international applications may be used for surface coating or repair of an object, such as a pipe, by applying it onto the surface of such object. The use for stabilizing a geological formation in oil fields, gas fields, water pumping fields, mining or tunnel constructions is not disclosed. They suffer from high brittleness and are therefore not suitable for such an application.

U.S. Pat. No. 4,698,408 discloses a two-component polyurethane based mixture having improved thermal stability which comprises a first mixture of an isocyanate prepolymer and a polyepoxide which is essentially free of hydroxyl groups and a second mixture of a polyol, a urethane curing catalyst and an epoxy curing catalyst. After combining the first and second mixture an adhesive is obtained which is used for preparing laminated structures and is unsuitable for stabilizing geological formations. U.S. Pat. No. 5,326,833 discloses reactive compositions comprising a polyisocyanate, a mono- or polyepoxide and a catalyst, liquid at a temperature of less than 70° C., consisting of a solution of at least one alkali metal halide in a polyoxyalkylenic compound. The compositions gel and solidify at temperatures between 0° C. and 70° C. and are used for the manufacture of finished or semi-finished articles, surface coatings, adhesives, sealants and foams. US 2007/0093566 discloses a process for infrastructure repair and geo-stabilization which reduce the generation and accumulation of heat. The process comprises filling an earthen cavity with a low-exotherm polyurethane foam, grout or elastomer made from a polyisocyanate, an isocyanate-reactive compound such as water or a mono- or polyol, and a particulate material capable of absorbing heat such as thermoplastic polymers.

WO 2014/096349 describes the use of a polyurea silicate composition in a method of strengthening a wellbore. US 2010/0087566 A1 describes a method of treating an earth formation that includes introducing a blocked isocyanate and a polyamine or polyol into the earth formation. Pot life of said materials was determined at room temperature. There is no indication that these materials do provide a suitable pot life at about 80 to 100° C.

The problem underlying the invention is therefore to provide a material for use in stabilizing geological formations, which provides a sufficient pot life at higher temperatures, for example 80 to 100° C., and which can be cured sufficiently quickly at temperatures above said temperature range. A further problem underlying the invention is to provide a method for stabilizing geological formations.

These problems are solved by the use of a composition for stabilizing a geological formation in oil fields, gas fields, water pumping fields, mining or tunnel constructions. Thus, in one aspect the invention relates to the use of a composition for stabilizing a geological formation in oil fields, gas fields, water pumping fields, mining or tunnel constructions wherein the composition comprises
(a) a polyisocyanate,
(b) a mixture obtainable by mixing an alkali metal or alkaline earth metal salt, in particular a salt selected from an alkali metal halide, cyanide, nitrate, sulfate, hydrogen sulfate, sulfite, hydrogen sulfite, carbonate, hydrogen carbonate, phosphate, hydrogen phosphate, dihydrogen phosphate, carboxylate, sulfonate, or amidosulfonate or from an alkaline earth metal halide, hydrogen sulfate, or nitrate, with a compound obtainable by reacting a polyisocyanate (a1) with a compound having one or more hydroxy groups and
(c) an epoxy group containing compound;
a method for stabilizing a geological formation in oil fields, gas fields, water pumping fields, mining or tunnel constructions, which comprises providing a composition as defined above, introducing the composition into the formation and allowing the composition to cure;
and further relates to a composition comprising
(a) a polyisocyanate,
(b) a mixture obtainable by mixing an alkali or alkaline earth metal salt, in particular a salt selected from an alkali metal halide, cyanide, nitrate, sulfate, hydrogen sulfate, sulfite, hydrogen sulfite, carbonate, hydrogen carbonate, phosphate, hydrogen phosphate, dihydrogen phosphate, carboxylate, sulfonate, or amidosulfonate or from an alkaline earth metal halide, hydrogen sulfate, or nitrate, with a compound obtainable by reacting 50 to 150 mol-%, especially 90 to 110 mol-%, in particular 100 mol-%, of polyisocyanate (a1) with an alcohol having one hydroxy group, and
(c) an epoxy group containing compound,
wherein the mixture is essentially free of polyols.

Essentially free of a substance means here that less than 5%, preferably less than 2%, more preferably less than 1% and in particular 0% of the substance, based on the total weight of the composition, is contained in the composition.

In a further embodiment the invention relates to the use of said compositions for stabilizing an oil well, a gas well or a water well in a geological formation, for example for filling cavities in the geological formation. The cavity to be filled and stabilized may include various types of cavities, annuli and formation fractures in an underground well. The term annulus refers to a void which is formed between the geological formation and any piping, tubing or casing introduced into the wellbore during or after drilling the formation.

Filling cavities in a geological formation preferably comprises introducing the composition into the cavities by means of injecting or pumping and allowing the composition to set (cure). Accordingly, loose geological material may be fixed by introducing the composition into an area near the loose geological material by means of injecting or pumping and allowing the composition to set, so that adhesion between the loose material and the hardened composition occurs.

The composition of the invention can be used in mining, oil fields, gas fields, water pumping fields or tunnel constructions, preferably for the stabilization of gravelly soil, the reinforcement of fractured rocks, the stabilization of mineral deposits as well as fissures within coal deposits before extraction and during extraction, for blocking of the ingress of ground water into gas, water and oil wells or coal deposits, for sealing of rock mass, for tamponading exploratory bores, sealing of thermal springs, for the erection of impermeable curtains and barriers or for the protection of mechanically loaded floors or reservoirs.

The mechanical properties of the composition of the invention are particularly valuable for stabilizing wellbores. Moreover, the composition is found to be particularly stable, when in contact with chemicals such as strong acids, strong bases or hydrocarbons. This chemical stability renders the composition an ideal material for applications in oil and gas wells.

In a further embodiment, the composition of the invention may be used in drilling muds, for enhancing oil recovery, as loss circulation agent, in wellbore strengthening treatments, for soil stabilization, as a dust suppressant, as a water retainer or a soil conditioner or in hydrotreating fluid loss additives.

When used as an additive in drilling muds, the composition may be deposited along the wellbore throughout the drilling process, for strengthening the wellbore by stabilizing shale formations and other sections encountered while drilling. Improved wellbore stability will reduce the occurrence of stuck pipe, hole collapse, hole enlargement, lost circulation, and will improve well control.

Further, the composition may also aid in lifting solid debris from tubing walls and through the tubing annulus. The hardened composition circulating through the drill pipe during drilling may scrape and clean the drill pipe, removing any pipe scale, mud, clay, or other agglomerations that may have adhered to the drill pipe or drill tubing. In this manner, the drill pipe may be maintained free of obstructions that could otherwise hinder removal of drilled solids from the drill pipe during drilling.

In a further embodiment, the composition comprises
component (a): 85-99 wt.-%, preferably 87-98 wt.-%;
component (b): 0.1-3 wt.-%, preferably 0.4-2.6 wt.-%;
component (c): 0.1-12 wt.-%, preferably 1.6-10.4 wt.-%;
based on the total weight of the components.

The ratio of the components (a):[(b)+(c)] is therefore, in general, in a range of 85-99 wt.-%:1-15 wt.-%, preferably 87-98 wt.-%:2-13 wt.-%. The weight ratio of component (b) to (c) is, in general, 1:1 to 1:8, preferably 1:2 to 1:6.

In a further embodiment the alkali metal or alkaline earth metal salt and the polyisocyanate (a1) are used in a molar ratio of 0.2 to 0.8, preferably 0.3 to 0.7.

The hardening temperature of the composition can be controlled by the amount of the components (b) and (c). The higher the amount of components (b) and (c), the lower is the hardening temperature. For instance, no hardening of the composition occurs at 80° C., in case components (b) and (c) together are contained in the composition in an amount of less than 3 wt.-%, based on the total weight of the components of the composition. In case components (b) and (c) together are contained in the composition in an amount of about 4 to 15 wt.-%, for example 5 to 15 wt.-%, based on the total weight of the components of the composition, hardening of the composition occurs at 60° C. or below. At temperatures above 100° C., preferably above 120° C., e.g. 100 to 180° C. or 110 to 150° C., hardening of the composition, for example in gas wells, oil wells or water wells occurs quickly within seconds or minutes. For instance, hardening of the composition at 130° C. in general takes place within 1 sec to 20 min.

A further embodiment therefore relates to the use of a composition for stabilizing a geological formation in oil fields, gas fields, water pumping fields, mining or tunnel constructions, wherein the composition comprises
(a) 85-99 wt.-%, preferably 87-98 wt.-% of a polyisocyanate, (b) a mixture obtainable by mixing an alkali metal or alkaline earth metal salt with a compound obtainable by reacting a polyisocyanate (a1) with a compound having one or more hydroxy groups and (c) an epoxy group containing compound, wherein the sum of the amounts of component (b) and component (c) is 0.2-3 wt.-%, preferably 1-2 wt.-% and the weight ratio of component (b) to (c) is, in general, 1:1 to 1:8, preferably 1:2 to 1:6.

A further embodiment therefore relates to the use of a composition for stabilizing a geological formation in mining or tunnel constructions, wherein the composition comprises (a) 85-96 wt.-%, preferably 85-95 wt.-% of a polyisocyanate, (b) a mixture obtainable by mixing an alkali metal or alkaline earth metal salt with a compound obtainable by reacting a polyisocyanate (a1) with a compound having one or more hydroxy groups and (c) an epoxy group containing compound, wherein the sum of the amounts of component (b) and component (c) is 0.2-15 wt.-%, preferably 5-15 wt.-% and the weight ratio of component (b) to (c) is, in general, 1:1 to 1:8, preferably 1:2 to 1:6.

The composition of the invention advantageously is very versatile with regard to the pot life. It provides a pot life of at least 3 hours, preferably of at least 5 hours, more preferably of up to 10 hours within a temperature range of 40 to 120° C. The pot life in the context of the present invention is the time, after which the composition has lost its self-levelling properties. The composition is advantageously suitable for stabilizing bore holes, for example gas wells, oil wells or water wells, in geological formations, wherein the stabilization takes place in areas of higher temperatures, e.g. 80 to 100° C., of the geological formation. The risk that the mixture sets too early is therefore minimized.

Polyisocyanates (a) are isocyanate compounds having two, three or more isocyanate groups. The polyisocyanates include all aliphatic, aromatic or cycloaliphatic polyisocyanates, isomers, homologs or prepolymers thereof, as well as carbodiimide-, uretdione-, allophanate- or uretonimine-modified derivatives thereof, that are known for the preparation of polyurethanes. According to one embodiment aliphatic isocyanates are used. According to another embodiment aromatic isocyanates are used. Examples are 2,2'-, 2,4'- and 4,4'-diphenylmethane diisocyanate, mixtures of monomeric diphenylmethane diisocyanates and higher homologues of diphenylmethane diisocyanate (polymeric MDI), isophorone diisocyanate (IPDI) or its oligomers, methylcyclohexane diisocyanate, 2,4- or 2,6-toluylene diisocyanate (TDI) or mixtures thereof, tetramethylxylylene diisocyanate (TMXDI), tetramethylene diisocyanate or its oligomers, pentamethylene diisocyanate, or oligomers thereof, hexamethylene diisocyanate (HDI), or oligomers thereof, naphthylene diisocyanate (NDI) or mixtures thereof, wherein in each case the average isocyanate functionality of the polyisocyanates (a) is preferably less than 3.0.

Preferably used as polyisocyanate (a) are monomeric diphenylmethane diisocyanate, such as 2,2'-diphenylmethane diisocyanate, 2,4'-diphenylmethane diisocyanate, 4,4'-diphenylmethane diisocyanate or mixtures thereof, preferably 4,4'-diphenylmethane diisocyanate. Diphenylmethane diisocyanate may also be used as a mixture with its derivatives. Diphenylmethane diisocyanate may further contain carbodiimide-, uretdione-, allophanate- or uretonimine-modified diphenylmethane diisocyanate, in particular carbodiimide-modified diphenylmethane diisocyanate in an amount of for example up to 10 wt.-%, preferably up to 5 wt.-% based on the total amount of the diphenylmethane diisocyanate.

Polyisocyanates (a) can also be used in form of polyisocyanate prepolymers. Said polyisocyanate prepolymers are obtainable by reacting an excess of polyisocyanates, for example at temperatures of from 30 to 100° C., preferably at about 80° C., with polyols. The NCO content of the polyisocyanate prepolymers is preferably from 5 to 32 wt.-% NCO, more preferably from 15 to 28 wt.-% NCO. The prepolymers include urethane groups. A compound comprising urethane groups may also include isocyanurate units.

Polyols are known in the art and described for example in "Plastics Handbook, Volume 7, "Polyurethane", Carl Hanser Verlag, 3rd Edition 1993, Chapter 3.1. For example polyetherols or polyesterols may be used as polyols. Preferably, the polyols have secondary OH groups. A particular example is polypropylene oxide. The polyols have a hydroxyl functionality of for example 2 to 6, preferably 2 to 4, particularly 2 to 3.

Optionally, chain extenders may be added during the polyisocyanate prepolymer preparation. Preferred chain extenders are di- or trivalent alcohols, such as dipropylene glycol and/or tripropylene or the adducts of dipropylene glycol and/or tripropylene with alkylene oxides. Such polyisocyanate prepolymers are for example described in U.S. Pat. No. 3,883,571, WO 02/10250 and U.S. Pat. No. 4,229,347.

Preferably used as the polyisocyanate (a) is 4,4'-diphenylmethane diisocyanate or a polyisocyanate prepolymer which is obtained by reacting monomeric 4,4'-diphenylmethane diisocyanate or mixtures of 4,4'-diphenylmethane diisocyanate and its derivatives with a polyol, having an hydroxy functionality of 2 to 4, such as polyalkylene oxide, for instance polypropylene oxide or polyethylene oxide, or dipropylene glycol.

Component (b) is a mixture obtainable by mixing an alkali metal or alkaline earth metal salt with a compound obtainable by reacting a polyisocyanate (a1) with a compound having one or more hydroxy groups.

As an alkali metal or alkaline earth metal salt, a salt is used, which is able to accelerate the reaction of isocyanates and an epoxy group-containing compound. These salts are alkali metal or alkaline earth metal salts such as salts of sodium, lithium, potassium, magnesium and calcium with anions. The salt is preferably selected from an alkali metal halide, cyanide, nitrate, sulfate, hydrogen sulfate, sulfite, hydrogen sulfite, carbonate, hydrogen carbonate, phosphate, hydrogen phosphate, dihydrogen phosphate, carboxylate, sulfonate, or amidosulfonate or from an alkaline earth metal halide, hydrogen sulfate, or nitrate. Carboxylates, nitrates, halides, sulfates, sulfites and phosphates are preferred. More preferably used are nitrates and halides, for example, chlorides or bromides. Preferred is the use of lithium chloride, lithium bromide and magnesium chloride, in particular lithium chloride. The alkali metal or alkaline earth metal salts may be used alone (just one particular salt) or as mixtures of two or more of the suitable salts.

Preferably, apart from the alkali metal or alkaline earth metal salts, no additional compounds accelerating the reaction of isocyanates with groups that are reactive towards isocyanates are added.

The reaction product of polyisocyanate (a1) and the compound having one or more hydroxy groups is a urethane group containing compound. The term urethane group also refers to isocyanurate groups. Isocyanurate groups and urethane groups may both be contained in the composition of the invention. Isocyanurate formation may occur, when polyisocyanate (a1) is reacted with the compound having one or more hydroxy groups in such manner that the isocyanate groups are present in a stoichiometric excess.

Urethane group-containing compounds are for example compounds that are solid or liquid at 20° C. and contain at least one urethane group. Preferred are compounds that are liquid at 50° C., particularly preferred are compounds that are liquid at room temperature. A liquid compound in this context is a compound that has a viscosity of 10 Pas at a certain temperature. In the case no temperature is stated, the viscosity refers to a temperature of 20° C. The viscosity measurement is carried out according to ASTM D445-1. Preferably, the urethane group-containing compound has at least two urethane groups. The molecular weight of the urethane group-containing compound is, for example, in a range of from 200 to 15000 grams per mole, preferably 300 to 10000 grams per mole, and in particular 500 to 1300 grams per mole. Urethane group-containing compounds are obtainable by a reaction of isocyanates (a1) with compounds having at least one hydroxy group that is reactive towards isocyanates. The compounds having at least one hydroxyl group in general have number average molecular weights of 30 to 15.000 g/mole, preferably 100 to 900 g/mole and in particular 400 to 600 g/mole. Examples are alcohols, such as methanol, ethanol, propanol, butanol, pentanol, hexanol, or propoxylated or ethoxylated monools, such as poly(ethylene oxide) monomethyl ether, for example, the mono-functional Pluriol-types of BASF SE having a molecular weight of from 200 to 1000 grams per mole, dialcohols, such as ethylene glycol, diethylene glycol, triethylene glycol, propylene glycol, dipropylene glycol, butane diol and hexane diol. Particularly preferred are mono-functional alcohols, such as the Pluriol-types of BASF SE for example having a molecular weight of from 200 to 1000 grams per mole, preferably from 350 to 550 g/mole. For the preparation of the urethane group-containing compound, the hydroxyl group-containing compound is preferably used in a stoichiometric amount or in a stoichiometric excess. The stoichiometric excess is preferably 0.01 to 30 mol %, in particular 0.05 to 20 mol %, based on the molar amount of isocyanate groups.

In one embodiment the urethane group containing compound is obtainable by reacting polyisocyanate (a1) with a compound having one hydroxy group, such that the polyisocyanate (a1) is used in a stoichiometric excess 0.01 to 50 mol %, in particular 0.05 to 20 mol %, preferably 0.9 to 10 mol-%, based on the molar amount of hydroxyl groups.

The preparation of the urethane group containing compound is usually carried out at temperatures of from 20 to 120° C., for example at 70° C. As polyisocyanate (a1) the polyisocyanates as outlined above for polyisocyanates (a) can be used. Diphenyl methane isocyanates having two or more isocyanate groups, isomers, homologues and mixtures thereof are particularly preferred. In particular, isocyanate (a1) is monomeric diphenylmethane diisocyanate, for example 2,2'-diphenylmethane diisocyanate, 2,4'-diphenylmethane diisocyanate, 4,4'-diphenylmethane diisocyanate or a mixture thereof. Diphenylmethane diisocyanate may also be used as a mixture with its derivatives. Diphenylmethane diisocyanate may contain carbodi-imide-, uretdion-, allophanat- or uretonimine-modified diphenylmethane diisocyanate in amounts of up to 10 wt-%, preferably up to 5 wt-%.

In a particularly preferred embodiment of the invention, isocyanate (a) and isocyanate (a1) are the same.

Mixture (b), containing the alkali metal or alkaline earth metal salt and a urethane group-containing compound is obtainable by mixing the alkali metal or alkaline earth metal salt with the urethane group-containing compound, for example, at room temperature or increased temperature. For the purpose of mixing, any mixing device, for example a stirrer, may be used. The alkali metal or alkaline earth metal salt may be used in pure form or in form of a solution, for example, in alcohols, such as methanol or ethanol. In a particularly preferred embodiment, a prepolymer-based isocyanate is directly contacted with a dissolved salt. Suitable are, for example, isocyanate pre-polymers having an NCO-content of from 15 to 30%, in particular those that are based on diphenylmethane diisocyanate and a polyether polyol. Such isocyanates are, for example, commercially available from BASF SE under the tradename Lupranat® MP 102.

In a particularly preferred embodiment of the invention, the alkali metal or alkaline earth metal salt is dissolved in a compound having hydrogen atoms that are reactive towards isocyanate-prior to its addition to the compound obtainable by reacting a polyisocyanate (a1) with a compound having one or more hydroxy groups. Such compounds are alcohols like methanol, ethanol, n-propanol or isopropanol. Solvents used for the dissolution of alkali metal or alkaline earth metal salts may be removed from mixture (b) by distillation at ambient or reduced pressure.

The content of alkali metal or alkaline earth metal ions per urethane group in mixture (b) is for example from 0.0001 to 3.5 molar equivalents, preferably 0.01 to 1.0 molar equivalents, in particular 0.05 to 0.9 molar equivalents, in each case based on the number of alkali metal or alkaline earth metal ions and urethane groups (per equivalent urethane groups).

Suitable as the epoxy group containing compound (c) are all epoxy group containing compounds, which are generally used in the preparation of epoxy resins and are liquid at 25° C. Also mixtures of said compounds may be used, provided the mixture is liquid at 25° C. Examples for epoxy group containing compounds are I) Polyglycidyl and poly(β-methylglycidyl) esters, obtainable by reacting a compound having at least one, preferably at least two carboxyl groups in the molecule and epichlorohydrin or β-methylepichlorohydrin. The reaction is conveniently carried out in the presence of bases. Compounds having at least two carboxyl groups may be polycarboxylic acids, such as oxalic acid, succinic acid, glutaric acid, adipic acid, pimelic acid, suberic acid, azelaic acid or dimerized or trimerized linoleic acid. Further, polycarboxylic acids, such as tetrahydrophthalic acid, 4-methyltetrahydrophthalic acid, hexahydrophthalic acid or 4-methylhexahydrophthalic acid, or aromatic carboxylic acids, such as phthalic acid, isophthalic acid or terephthalic acid, may be used. Suitable compounds having one carboxyl group are, for example, stearic acid, or acetic acid.

II) Polyglycidyl or poly(β-methylglycidyl) ethers, obtainable by reacting a compound having at least two free alcoholic hydroxyl groups and/or phenolic hydroxyl groups and epichlorohydrin or β-methylepichlorohydrin under alkaline conditions or in the presence of an acidic catalyst and subsequent alkali treatment.

The glycidyl ethers of this type are typically derived from acyclic alcohols such as ethylene glycol, diethylene glycol or higher poly(oxyethylene)glycols, propane-1,2-diol, poly(oxypropylene)glycols, propane-1,3-diol, butane-1,4-diol, poly(oxytetramethylene)glycol, pentane-1,5-diol, hexane-1,6-diol, hexane-2,4,6-triol, glycerol, 1,1,1 trimethylolpropane, pentaerythritol or sorbitol, and from polyepichlorohydrins. Glycidyl ethers of type II) may also be derived from cycloaliphatic alcohols, such as 1,4-cyclohexane dimethanol, bis(4-hydroxy-cyclohexyl)methane or 2,2-bis(4-hydroxy-cyclohexyl) propane, or compounds such as N,N-bis (2-hydroxyethyl)aniline or p,p'-bis (2-hydroxyethylamino) diphenylmethane.

The glycidyl ethers can also be derived from phenols such as p-tert-butylphenol, resorcinol or hydroquinone, or bis (4-hydroxyphenyl)methane, 4,4'-dihydroxybiphenyl, bis(4-hydroxyphenyl)sulfone, 1,1,2,2-tetrakis(4-hydroxyphenyl) ethane, 2,2-bis(4-hydroxyphenyl)propane or 2,2-bis(3,5-dibromo-4-hydroxyphenyl)propane.

Further suitable are novolaks, obtainable by condensation of aldehydes, such as formaldehyde, acetaldehyde, chloral or furfuraldehyde, with phenols or bisphenols, optionally substituted with chlorine atoms or $C_1$-$C_9$ alkyl groups, for example phenol, 4-chlorophenol, 2-methylphenol or 4-tert-butylphenol.

III) Poly(N-glycidyl) compounds, obtainable by dehydrochlorination of the reaction products of epichlorohydrin and amines, which contain at least two amine hydrogen atoms. Examples for such amines are aniline, n-butylamine, bis(4-aminophenyl)methane, m-xylylenediamine or bis(4-methyl-aminophenyl)methane.

The poly(N-glycidyl) compounds also include triglycidyl isocyanurates, N, N'-diglycidyl derivatives of cycloalkylene ureas, such as ethylene urea or 1,3-propylene urea, and diglycidyl derivatives of hydantoins, such as of 5,5-dimethylhydantoin.

IV) Poly(S-glycidyl) compounds, like di-S-glycidyl derivatives, which are obtainable from dithiols, such as ethan-1,2-dithiol or bis(4-ercaptomethylphenyl)ether.

V) Cycloaliphatic epoxy resins, for example bis(2,3-epoxycyclopentyl) ether, 2,3-epoxycyclopentyl glycidylether, 1,2-bis(2,3-epoxycyclopentyloxy) ethane or 3,4-epoxycyclohexylmethyl-3',4'-epoxycyclohexanecarboxylate.

VI) Monofunctional epoxy compound, such as (2-ethylhexyl)-glycidylether, isopropylglycidylether, butylglycidylether or kresylglycidylether.

VII) Epoxidized vegetable oils and fatty acid triglycerides such as epoxidized soybean oil, rape seed oil, sun flower oil, linseed oil, palm oil, wheat germ oil, peanut oil, triglycerides with acids such as caprylic acid, capric acid, lauric acid, myristic acid, palmitic acid, oleic acid, linoleic acid, or ricinoleic acid.

Further, epoxy resins may be used, in which the 1,2-epoxide groups are attached to different hetero atoms or functional groups; these compounds include, for example, the N,N,O-triglycidyl derivatives of 4-aminophenol, the glycidyl ethers-glycidyl esters of salicylic acid, N-glycidyl-N'-(2-glycidyloxypropyl)-5,5-dimethyl hydantoin or 2-glycidyloxy-1,3-bis(5,5-dimethyl-1-glycidylhydantoin-3-yl) propane.

Preferably component (c) is selected from classes (I) and (II), in particular from class (II). The epoxy group-containing compound (c) is used in an amount, such that the equivalent ratio of epoxy groups to isocyanate groups of the polyisocyanate (a) and optionally to the isocyanate groups in mixture (b) is 0.1 to 2.0, preferably 0.2 to 1.8 and, in particular, 0.3 to 1.0. A greater amount of epoxy groups in general leads to a faster hardening at increased temperature and vice versa.

The amount of alkali metal or alkaline earth metal ions per epoxy group is, for example, greater than 0.00001 and is preferably from 0.00005 to 0.3, in each case based on the number of alkali metal or alkaline earth metal ions and epoxy groups.

In one embodiment compound (c) contains two, three or more epoxy groups per molecule.

In a further embodiment the composition additionally comprises a compound (d) selected from monools, polyols, alkoxylated monools and alkoxylated polyols. Compound (d) may be added to component (b) and/or (c). The amount of compound (d) is for example in a range of from 0 to 30 wt.-%, preferably 1 to 20 wt.-%, in particular 1 to 15 wt.-%, based on the total weight of the composition.

Suitable monools are for example selected from methanol, ethanol, propanol, butanol, pentanol or hexanol. The term "alkoxylated" refers to etherfied hydroxyl groups, wherein the hydroxyl group is end-capped with an alkyl residue, preferably a $C_1$ to $C_6$ alkyl residue. Particularly preferred are methoxylated, ethoxylated or propoxylated monools or polyols. Suitable polyols are in particular compounds with at least two groups reactive towards isocyanates, such as OH, SH, NH and CH-acidic groups, and a molecular weight of at least 350 g/mol, preferably 400 g/mol, in particular 500 g/mol. Preferably, polyols essentially have hydroxy groups as groups reactive towards isocyanates. For instance, the polyols have at least 40%, preferably 60%, more preferably 80% and in particular at least 95% secondary OH-groups, with respect to all groups reactive towards isocyanates.

As polyols, polyethers, polycarbonate polyols or polyesters may be used. Preferably used are such compounds having a number average molecular weight between 350 and 12000, preferably 400 to 6000, in particular 500 to 3000 g/mole and an average nominal functionality of from 2 to 6, preferably 2 to 3. The number average molecular weights are determined by using the OH number according to DIN 53240 and applying the formula $M_n = Fn \cdot 1000 \cdot 56.1/OH$ number. The functionality applied is the nominal functionality.

Usually, polyether polyols and/or polyester polyols having from 2 to 8, preferably 2 to 6, hydrogen atoms reactive towards isocyanates are used. The OH number of these compounds is usually in the range of 30 to 850 mg KOH/g, preferably in the range of 50 to 600 mg KOH/g.

The polyether polyols may be obtained by known methods, for example by anionic or cationic polymerization of alkylene oxides with at least one initiator molecule containing 2 to 8, preferably 2 to 6, reactive hydrogen atoms, in the presence of catalysts. As catalysts, alkali metal hydroxides, such as sodium or potassium hydroxide or alkali metal alkoholates, such as sodium methylate, sodium or potassium ethylate or potassium isopropylate may be used. For cationic polymerizations Lewis acids, such as antimony pentachloride, boron trifluoride etherate or bleaching earth may be used as catalysts. Further, double metal cyanide catalysts can be used. For polyetherols with hydroxyl numbers greater than 200 mg KOH/g tertiary amines, such as imidazole, may be used as a catalyst. Polyols obtainable according to the latter procedure are for example described in WO 2011/107367.

As alkylene oxides one or more compounds having 2 to 4 carbon atoms in the alkylene radical may be used, for example ethylene oxide, tetrahydrofurane, 1,2-propylene oxide, 1,3-propylene oxide, 1,2- or 2,3-butylene oxide, in each case alone or in the form of mixtures, preferably used is ethylene oxide or 1,2-propylene oxide.

As starter molecules compounds such as ethylene glycol, diethylene glycol, glycerol, trimethylolpropane, pentaerythritol, sugar derivatives such as sucrose, hexite derivates such as sorbitol, methylamine, ethylamine, isopropylamine, butylamine, benzylamine, aniline, toluidine, toluene diamine, especially 1,2-toluene diamine, naphthylamine, ethylenediamine, diethylenetriamine, 4,4'-methylenedianiline, 1,3 propanediamine, 1,6-hexane diamine, ethanolamine, diethanolamine, triethanolamine and other polyvalent alcohols or one or polyvalent amines may be used.

The polyester alcohols used are usually prepared by condensation of polyfunctional alcohols having 2 to 12 carbon atoms, such as ethylene glycol, diethylene glycol, butanediol, trimethylolpropane, glycerol or pentaerythritol, with polyfunctional carboxylic acids having 2 to 12 carbon atoms, such as succinic acid, glutaric acid, adipic acid, azelaic acid, sebacic acid, decanedicarboxylic acid, maleic acid, fumaric acid, phthalic acid, isophthalic acid, terephthalic acid, the isomers of naphthalenedicarboxylic acids or the anhydrides of the above acids.

As further starting materials in the preparation of the polyesters also hydrophobic substances can be used. The hydrophobic substances are water-insoluble substances, which comprise a nonpolar organic residue and at least one reactive group selected from hydroxyl, carboxylic acid, carboxylic acid ester or mixtures thereof. The equivalent weight of the hydrophobic materials is preferably between 130 and 1000 g/mol. For example, fatty acids such as stearic acid, oleic acid, palmitic acid, lauric acid or linoleic acid, as well as fats and oils, such as castor oil, corn oil, sunflower oil, soybean oil, coconut oil, olive oil or tall oil can be used. The content of hydrophobic materials with respect to the total amount of monomers of the polyester alcohol is for example from 1 to 30 mole-%, preferably from 4 to 15 mole-%.

The polyesterols used for example have an OH-functionality of from 1.5 to 5, preferably from 1.8-3.5.

In the case the condensation of water shall be prevented during the open time, the polyol may contain a further hydroxyl-functionalized hydrophobic compound, for example, a hydroxyl-functionalized fatty chemical compound.

Examples for hydroxy functional fatty chemical components that may be used are castor oil, hydroxyl-modified oils such as grapeseed oil, black cumin oil, pumpkin seed oil, borage seed oil, soybean oil, wheat germ oil, rapeseed oil, sunflower oil, peanut oil, apricot kernel oil, pistachio oil, almond oil, olive oil, macadamia nut oil, avocado oil, sea buckthorn oil, sesame oil, hazelnut oil, evening primrose oil, wild rose oil, hemp oil, walnut oil, hydroxyl-modified fatty acid esters based on myristoleic acid, palmitoleic acid, oleic acid, vaccenic acid, petroselinic acid, gadoleic, erucic, nervonic acid, linoleic acid, linolenic acid, stearidonic acid, arachidonic acid, timnodonic acid, clupanodonic acid and cervonic acid. Preferably used are castor oil and its reaction products with alkylene oxides or ketone-formaldehyde resins. The latter compounds are sold, for example, by Bayer AG under the name Desmophen® 1150.

A further suitable group of fatty chemical polyols can be obtained by ring opening of epoxidized fatty acid esters with simultaneous reaction with alcohols and, optionally, subsequent further transesterification reactions. The incorporation of hydroxyl groups into oils and fats is performed by epoxidation of the olefinic double bond present in these products followed by the reaction of the epoxide groups with a monovalent or polyvalent alcohol. Such the epoxide ring is converted to hydroxyl groups or polyfunctional alcohols. The compounds thus obtained have for example a molecular weight ranging from 500 to 1500 g/mol. Such products are for example sold by BASF SE (Sovermol®).

In a particularly preferred embodiment castor oil is used as polyol (d).

Also polyetherol/polyesterol-hybride-polyols as described in WO 2013/127647 and WO 2013/110512 may be applied as polyols.

In one embodiment of the invention, the composition is essentially free of polyols. "Essentially free of polyols" is as defined above. It means that essentially no polyol compound is added during the preparation of the composition or afterwards. However, polyols may be contained as impurities in a non-significant amount.

In a further embodiment of the invention, the polyurethane composition comprises
(a) a polyisocyanate,
(b) a mixture obtainable by mixing a salt selected from an alkali metal halide, cyanide, nitrate, sulfate, hydrogen sulfate, sulfite, hydrogen sulfite, carbonate, hydrogen carbonate, phosphate, hydrogen phosphate, dihydrogen phosphate, carboxylate, sulfonate, or amidosulfonate or from an alkaline earth metal halide, hydrogen sulfate, or nitrate, with a compound obtainable by reacting 50 to 150 mol-%, especially 90 to 110 mol-%, in particular 100 mol-%, of polyisocyanate (a1) with a compound having one hydroxy group, based on the molar amount of alcohol, and
(c) an epoxy group containing compound,
wherein the mixture is essentially free of polyols.

The compounds (a), (a1), (b) and (c) and any amounts and ratios are defined as above.

In a preferred embodiment the composition additionally comprises a weighting agent, in particular $BaSO_4$.

The compound having one hydroxy group is preferably selected from methanol, ethanol, propanol, butanol, pentanol, hexanol or poly(ethyleneoxide)monoalkylethers, for example the monofunctional Pluriol® compounds of BASF SE having a molecular weight of from 200 to 1000 g/mol, in particular Pluriol A 500 E (average molecular weight of 500 g/mol).

In a preferred embodiment the composition of the invention additionally comprises one or more additives, selected from chain extenders, cross linkers, fillers, additives for water adsorption, weighting agents and flame retardants.

To modify the mechanical properties such as hardness, the addition of chain extenders, crosslinkers or optionally mixtures thereof, however, may be beneficial.

As chain extenders and/or crosslinking agents for example low molecular weight polyvalent alcohols, preferably diols and/or triols having molecular weights of less than 500, preferably from 60 to 400, in particular 60 to 350 g/mol may be used. Suitable compounds are for example, aliphatic, cycloaliphatic and/or araliphatic diols, or aromatic diols having 2 to 14, preferably 2 to 10 carbon atoms, such as ethylene glycol, propane-1,3-diol, butane-1,4-diol, hexane-1,6-diol, decane-1,10-diol, o-, m-, p-dihydroxycyclohexane, diethylene glycol, triethylene glycol, dipropylene glycol, tripropylene glycol, bis-(2-hydroxyethyl) hydroquinone, triols, such as 1,2,4- or 1,3,5-trihydroxycyclohexane, trimethylolethane, glycerol and trimethylolpropane. Further chain extenders or cross-linkers are for example described in "Kunststoffhandbuch, vol. 7, Polyurethane", Carl Hanser Verlag, 3rd edition 1993, Chapter 3.2 and 3.3.2.

Fillers, in particular reinforcing fillers, may be the known conventional organic and inorganic fillers, reinforcing agents, weighting agents, agents for improving the abrasion behavior in paints, coatings, etc. inorganic fillers such as silicate minerals, for example phyllosilicates, such as antigorite, serpentine, hornblende, amphibole, chrysotile and talc, metal oxides, such as kaolin, titanium oxides and iron oxides, metal salts, such as chalk, barite and inorganic pigments such as cadmium sulfide and zinc sulfide, and also glass. Preferably used are Kaolin (China Clay), montmorillonite and coprecipitates of barium sulfate and aluminum silicate and also natural and synthetic fibrous minerals such as wollastonite, metal and particularly glass fibers of various lengths, which may be arbitrated if necessary. Organic fillers are for example: carbon, melamine, rosin, cyclopentadienyl resins, graft polymers and cellulose fibers, polyamide-, polyacrylonitrile-, polyurethane-, polyester-fibers based on aromatic and/or aliphatic dicarboxylic esters. Preferably used as a weighting agent is barium sulfate, for example in the form of barite.

In general, fillers having an average particle diameter of 0.1 to 500, preferably from 1 to 100 and in particular from 1 to 10 µm are used. Examples for such fillers are glass or quartz flours, tissue mats, such as glass fibers, carbon fibers or natural fibers can be used as fillers.

Inorganic and organic fillers may be used as mixtures or single filler components. For example, 0.5 to 30 wt.-%, preferably 1 to 20 wt.-% of fillers, based on the total weight of the composition, may be contained in the composition.

As additives for water adsorption aluminum silicates selected from the group of sodium aluminum silicate, potassium aluminum silicate, calcium aluminum silicate, cesium aluminum silicate, barium aluminum silicate, magnesium aluminum silicate, strontium aluminum silicate, sodium aluminum phosphate, potassium aluminum phosphate, calcium aluminum phosphate and mixtures thereof are used. Mixtures of sodium, potassium and calcium aluminum silicates are preferably used in castor oil as a carrier substance.

The additive for water adsorption generally has a mean particle size of for example not greater than 200 µm, preferably not greater than 150 µm and in particular not greater than 100 µm. The pore size of the additive for water adsorption is preferably from 2 to 5 Ångström. Organic additives for water adsorption are for example orthoformates, such as triisopropyl orthoformates.

Additives for water adsorption are for example added in 1,2 to 2 wt.-%, based on the total weight of the composition.

Suitable flame retardants are, for example, brominated ethers (Ixol B 251), brominated alcohols such as dibromoneopentyl, tribromoneopentyl and tetrabromophthalate diol and also chlorinated phosphates such as tris(2-chloroethyl) phosphate, tris(2-chloroisopropyl) phosphate (TCPP), tris(1,3-dichloroisopropyl) phosphate, tris(2,3-dibromopropyl) phosphate and tetrakis(2-chloroethyl)ethylene diphosphate, or mixtures thereof. In addition to the abovementioned halogensubstituted phosphates, inorganic flame retardants, such as red phosphorus, preparations comprising red phosphorus, expandable graphite, aluminum oxide, antimony trioxide, arsenic oxide, ammonium polyphosphate and calcium sulfate or cyanuric acid derivatives such as melamine or mixtures of at least two flame retardants, such as ammonium polyphosphates and melamine, and where appropriate starch, are used.

Liquid halogen-free flame retardants that can be used are for example diethylethanephosphonate (DEEP), triethyl phosphate (TEP), Dimethylpropylphosphonat (DMPP) or diphenyl kresyl phosphate (DPK).

The flame retardants are for example contained in an amount of 0 to 60 wt.-%, preferably from 5 to 50 wt.-%, particularly from 5 to 40 wt.-%, based on the total weight of the composition.

Further, internal release agents can be used in the preparation of polyurethanes. Examples are metal salts dissolved in diamines, such as zinc stearate, and derivatives of polyisobutylene.

The composition of the invention preferably contains water in an amount of less than 0.5 wt.-%, in particular of less than 0.3 wt.-%, based on the total amount of the composition.

The preparation of the composition according to the invention is carried out by mixing components (a) to (c), and optionally the additives. Single components may be pre-mixed.

In one embodiment the composition of the invention is in the form of a kit-of-parts. Component (a) is contained in a first part and components (b) and (c) together are present in a second part or each of the components (a), (b) and (c) is present in a separate part. The term kit-of-parts basically refers to a composition, wherein certain components of the composition are packaged separately or placed or stored in reservoirs separated from each other by a suitable separation material, for example by suitable membrane materials or foils.

In the context of the invention the provision of the composition as a kit-of-parts is advantageous, because the separated components (a), (b) and (c) or (a) and (b)+(c) may in a first step be transported to the desired application area, while contact of the separated parts is prevented. In a second step the separated components may be combined to give the composition ready for use. Alternatively, the separated components may be introduced into the geological formation simultaneously or sequentially in any order.

In another aspect, the invention relates to a method for stabilizing a geological formation in oil fields, gas fields, water pumping fields, mining or tunnel constructions, which comprises providing a composition as defined in any one of the preceding embodiments, introducing the composition into the formation and allowing the composition to cure.

In general, the composition is introduced into the formation by pumping or injecting through lances or pipes. For pumping the composition into the formation, suitable pumping devices may be used, for example gear wheel pumps, piston pumps or diaphragm pumps. For injecting the composition into the cavities suitable injecting devices may be used, for example a machine consisting of a pump and an injection lance, which may be heated. A one-pump system can be used, when the components are pre-mixed or a dual-pump system can be used in combination with a static mixture for a two-component approach.

Curing or hardening the composition means that the composition is allowed to set and harden, until the final mechanical strength of the composition is reached up to at least 90%. The definition "reaching up to at least 90% of the final mechanical strength" is also referred to as hardening time. Hardening time of the composition at 25° C. is preferably up to 1000 hours, more preferably of from 200 to 800 hours, most preferably of from 300 to 500 hours. The hardening time in the context of the present invention defines the point in time at which the surface of the sample withstands a pressure of 0.327 N/mm$^2$ exhibited by a steel needle having a weight of 300 g and a diameter of 3 mm without deformation.

According to the method of the invention, a compact material is obtained, which means that preferably no foaming agent is added. However, small amounts of for example water can be present in the components or may be incorporated during mixing of the starting materials. A dense polyurethane is a polyurethane that is essentially free of enclosed gas. Preferably the density of a dense polyurethane is greater than 0.8 g/cm$^3$, in particular greater than 0.9 g/cm$^3$ and particularly preferably greater than 1.0 g/cm$^3$.

Compositions of the invention advantageously provide a long open time of for example more than 60 min, preferably more than 90 min, in particular more than 180 min at 80° C. The open time refers to a time range, beginning with the mixing of the components to the time, when the viscosity of the mixture has increased to a value, high enough to exceed the power of a Shyodu Gel Timer stirrer, Typ 100, Version 2012. For the determination of the open time 200 g of a reaction mixture were mixed in a speed mixer at 1950 rpm for 1 min and 130 g of the mixture were stirred in a polypropylene mug (diameter 7 cm) at room temperature or increased temperature in an oven. Stirring was performed using a Shyodu Gel-Timer, Typ 100, version 2012 at 20 rpm. The time range, beginning with the mixing of the components to the time, when the viscosity of the mixture has increased to a value, high enough to exceed the power of a Shyodu Gel Timer was determined.

For increased temperatures, for example greater than 100° C., preferably from 110 to 200° C. and in particular from 120 to 150° C. the composition hardens advantageously fast, for example in less than 50 minutes, preferably in less than 30 min, in particular in less than 10 min. Hardening of the composition refers to an increase of the starting viscosity by at least tenfold.

The isocyanate index of the composition may be in a range of from 50 to 10.000. For softer products, indices of 90 to 400, preferably 95 to 300, are suitable. For harder products indices of at least 400, for example 401 to 2000, preferably 450 to 1500 are suitable. Isocyanate index refers to the stoichiometric ratio of an isocyanate group to a group reactive towards an isocyanate, multiplied with the factor 100.

The present invention will be further illustrated by the following figures and examples.

EXAMPLES

Starting Materials:
Polyol 1 Castor oil
Polyol 2 Glycerol-started polypropylene oxide, OH-functionality=3, OHZ=400 mg KOH/g
Polyol 3 Polyester, based on adipic acid, OH-functionality=2, OHZ=56 mg KOH/g
GDE 1 Trimethylolpropane triglycidyl ether
GDE 2 Bisphenol A based diglycidylether, e.g. Araldite GY 250 of Huntsman
ZM1 triisopropylorthoformate
ZM 2 Reaction product of ethanol and Iso 1
ZM3 Reaction product of Iso 1 and a monofunctional polyethylene oxide having a number average molecular weight of 500 g/mol, available as "Pluriol® A 500 E" by BASF
Kat 1 Mixture of LiCl and ZM3, 0.50 eq. LiCl with respect to the number of urethane groups in ZM 3
Kat 2 Mixture of LiBr and ZM 2, 0.65 eq. LiBr with respect to the number of urethane groups in ZM2
Kat 3 Mixture of $MgCl_2$ and ZM 2, 0.65 eq. $MgCl_2$ with respect to the number of urethane groups in ZM2
Kat 4 Saturated LiCl solution in ethanol, concentration=0.67 mol/L, mathematically determined according to Knovel Critical Tables (2nd Edition)
Iso 1 Carbodiimide-modified 4,4'-Diphenylmethandiisocyanat (MDI), e.g. "Lupranat MM 103" by BASF, NCO-content 29.5%
Iso 2 Diphenylmethane diisocyanate (MDI) with higher homologues thereof, e.g. "Lupranat® M20" by BASF, NCO-content 31.5%
Iso 3 prepolymer, obtainable by conversion of diphenylmethane diisocyante, higher homologues of diphenylmethane diisocyanate and a polyetherol, NCO-functionality 2.4, NCO-content 28.5% (Lupranat® MP 105 by BASF)

Preparation of ZM 2 and 3: A glass flask was charged with the monool and the isocyanate was added under vigorous stirring. The mixture was heated to 70° C., until the reaction started. In the case the reaction started without heating, the mixture was cooled with ice/water mixture. In the case of a rather slow reaction, temperature was further increased to 90° C. and stirred for additional 30 min. After completion of the reaction, the reaction mixture was cooled to room temperature. During the whole procedure temperature was monitored by a temperature sensor. Depending on the molecular weight of the monool, the product was obtained as a solid or viscous oil.

Preparation of Kat 1-3: ZM 2 or 3 was admixed to a suitable amount of LiCl dissolved in ethanol and heated to 70° C. and stirred for 30 min at this temperature. Then the reaction mixture was cooled and excess ethanol was removed at reduced pressure. Depending on the molecular weight of the ZM, the product was obtained as a solid or viscous oil.

According to Table 1 the components 1 and 2 were in a speed mixer at 1950 rpm for 1 min at room temperature in the depicted weight ratios. Then the complete mixture with an index of 700 was mixed, using component 1 and 2. Mixing was carried out with a speed mixer at 1950 rpm for 1 min. Gelling time was determined by a Shyodu Gel timer, Type 100, Version 2012 at 25° C. and at 130° C.

TABLE 1

| Component 1 | | | | Component 2 | | | | Open time | |
|---|---|---|---|---|---|---|---|---|---|
| Polyol 1 | GDE 1 | Kat 1 | Iso 1 | Iso 1 | Kat 1 | GDE 1 | Index | RT | 130° C. |
| 16.31 | 3.84 | — | — | 79.45 | 0.4 | — | 700 | Several hours | <10 min |
| 16.31 | — | — | — | 79.45 | 0.4 | 3.84 | 700 | Several hours | <10 min |
| 16.31 | — | — | — | 79.45 | 0.4 | 3.84 | 700 | Several hours | <10 min |
| 16.31 | 3.84 | — | — | 79.45 | 0.4 | — | 700 | Several hours | <10 min |
| 16.31 | — | 0.4 | — | 79.45 | — | 3.84 | 700 | Several hours | <10 min |
| 16.31 | — | — | 79.45 | — | 0.4 | 3.84 | 700 | Several hours | <10 min |

TABLE 1-continued

| Component 1 | | | | Component 2 | | | | Open time | |
|---|---|---|---|---|---|---|---|---|---|
| Polyol 1 | GDE 1 | Kat 1 | Iso 1 | Iso 1 | Kat 1 | GDE 1 | Index | RT | 130° C. |
| 16.31 | — | 0.4 | — | 79.45 | — | 3.84 | 700 | Several hours | <10 min |
| 16.31 | — | — | 79.45 | — | 0.4 | 3.84 | 700 | Several hours | <10 min |
| 16.31 | 3.84 | 0.4 | — | 79.45 | — | — | 700 | Several hours | <10 min |
| 16.31 | — | 0.4 | 79.45 | — | — | 3.84 | 700 | Several hours | <10 min |
| 16.31 | 3.84 | 0.4 | — | 79.45 | — | — | 700 | Several hours | <10 min |
| 16.31 | — | 0.4 | 79.45 | — | — | 3.84 | 700 | Several hours | <10 min |
| 16.31 | 3.84 | 0.4 | 79.45 | — | — | — | 700 | Several hours | <10 min |
| 16.31 | 3.84 | — | 79.45 | — | 0.4 | — | 700 | Several hours | <10 min |
| 16.31 | 3.84 | 0.4 | 79.45 | — | — | — | 700 | Several hours | <10 min |

Table 1 shows that the order of admixing the specific compounds does not have an effect on the latent reaction.

According to Table 2 the depicted compounds were mixed in a speed mixer at 1950 rpm for 1 min at room temperature in the stated weight ratios. Then gelling time was determined by a Shyodu Gel timer, Type 100, Version 2012. Unless otherwise stated it is referred to percent by weight values.

TABLE 2

| | Comparative 1 | Comparative 2 | Comparative 3 | Comparative 4 | Example 1 | Example 2 | Example 3 |
|---|---|---|---|---|---|---|---|
| Polyol 1 | 77.0 | 77.0 | 77.0 | 100.0 | 77.0 | 77.0 | 77.0 |
| Polyol 2 | | | | | | | |
| Polyol 3 | | | | | | | |
| GDE 1 | 20.0 | 20.0 | 20.0 | | 20.0 | 20.0 | 20.0 |
| GDE 2 | | | | | | | |
| ZM1 | 3.0 | 3.0 | 3.0 | | 3.0 | 3.0 | 3.0 |
| Σ A component | 100.0 | 100.0 | 100.0 | 100.0 | 100.0 | 100.0 | 100.0 |
| ZM 2 | | 5.0 | | | | | |
| Kat 1 | | | | | 0.5 | 0.5 | 0.5 |
| Kat 2 | | | | | | | |
| Kat 3 | | | | | | | |
| Kat 4 | | | 2.3 | | | | |
| Iso 1 | | 95.0 | 97.7 | | 99.5 | 99.5 | 99.5 |
| Iso 2 | | | | | | | |
| Iso 3 | 100.0 | | | | | | |
| Σ B component | 100.0 | 100.0 | 100.0 | 100.0 | 100.0 | 100.0 | 100.0 |
| Index | 420 | 410 | 420 | 500 | 100 | 500 | 1700 |
| Mixing ratio | 100:245 | 100:243 | 100:242 | 100:515 | 100:57 | 100:283 | 100:962 |
| Open time (RT) | 1) | 1) | 1 min | 1) | Several hours | >1 week | >1 week |
| Open time (130° C.) | 1) | 1) | 1 min | 1) | 3 min | 6 min | 10 min |
| Difference in open time (RT vs 130° C.) | Not measurable | Not measurable | Not measurable | Not measurable | Several hours | >1 week | >1 week |

1) Hardly a reaction, viscosity increase over hours

| | Example 4 | Example 5 | Example 6 | Example 7 | Example 8 | Example 9 | Example 10 |
|---|---|---|---|---|---|---|---|
| Polyol 1 | 77.0 | 77.0 | 77.0 | | 77.0 | | |
| Polyol 2 | | | | 79.0 | | | |
| Polyol 3 | | | | | | 77.0 | |
| GDE 1 | 20.0 | 20.0 | 20.0 | 21.0 | | 20.0 | 100.0 |
| GDE 2 | | | | | 20.0 | | |
| ZM1 | 3.0 | 3.0 | 3.0 | | 3.0 | 3.0 | |
| Σ A component | 100.0 | 100.0 | 100.0 | 100.0 | 100.0 | 100.0 | 100.0 |
| ZM 2 | | | | | | | |
| Kat 1 | | | | 0.5 | 0.5 | 0.5 | 0.5 |
| Kat 2 | | 5.0 | | | | | |
| Kat 3 | | | 5.0 | | | | |
| Kat 4 | 0.5 | | | | | | |
| Iso 1 | | 95.0 | 95.0 | 99.5 | 99.5 | 99.5 | 99.5 |
| Iso 2 | | | | | | | |
| Iso 3 | 99.5 | | | | | | |
| Σ B component | 100.0 | 100.0 | 100.0 | 100.0 | 100.0 | 100.0 | 100.0 |
| Index | 410 | 410 | 410 | 500 | 500 | 700 | 500 |
| Mixing ratio | 100:293 | 100:307 | 100:307 | 100:312 | 100:265 | 100:263 | 100:1102 |
| Open time (RT) | 20 min | Several hours | Several hours | Several hours | Several hours | Several hours | Several hours |
| Open time (130° C.) | 2 min | 10 min | 40 min | 10 min | 10 min | 10 min | 10 min |

TABLE 2-continued

| Difference in open time (RT vs 130° C.) | 18 min | Several hours | Several hours | Several hours | Several hours | Several hours | Several hours |
|---|---|---|---|---|---|---|---|

Table 2 shows that without the addition of mixture (b) of the invention no reaction or a retarded reaction at room temperature is observable. Without the addition of Kat 1, 2, 3 or 4, the reaction does not start (Comparative 1 and 2). When LiCl is added, open time is about 1 min for room temperature and 130° C. (Comparative 3), the reaction is not retarded. It is also essential that a sufficient amount of urethane groups is present (Example 4). Examples 1 to 10 show that long open times at room temperature and a quick setting at 130° C. can be achieved for various isocyanate indices, different compounds with isocyanate groups and different alkali or earth alkali salts.

Table 3a shows mixtures with different indices that were obtained by using mixture (b) of the invention. Table 3b shows additional mixtures, wherein besides the index also additional mixing ratios were varied.

For that purpose the depicted components were mixed in a speed mixer at 1950 rpm for 1 min at room temperature in the stated weight ratios. Then the mixture was transferred into an aluminum mould (open on top, dimensions 30×20× 0.2) and reacted in an oven at 130° C. The characteristic values of Tables 3a and 3b were determined according to the norms as given in Tables 3a and 3b.

TABLE 3a

|  |  | Example 11 | Example 12 | Example 1 [Tab 1] | Example 13 | Example 14 | Example 2 [Tab 2] |
|---|---|---|---|---|---|---|---|
| Polyol 1 |  | 77 | 77 | 77 | 77 | 77 | 77 |
| GDE1 |  | 20 | 20 | 20 | 20 | 20 | 20 |
| ZM1 |  | 3 | 3 | 3 | 3 | 3 | 3 |
| Σ A component |  | 100 | 100 | 100 | 100 | 100 | 100 |
| Iso 1 |  | 99.5 | 99.5 | 99.5 | 99.5 | 99.5 | 99.5 |
| Kat 1 |  | 0.5 | 0.5 | 0.5 | 0.5 | 0.5 | 0.5 |
| Σ B component |  | 100 | 100 | 100 | 100 | 100 | 100 |
| Index |  | 50 | 90 | 100 | 150 | 250 | 500 |
| Mixing ratio |  | 100:28 | 100:51 | 100:57 | 100:85 | 100:142 | 100:283 |
| hardness | DIN 53505 | 26 A | 52 A | 67 A | 82 A | 77 D | 87 D |
| Tensile strength [MPa] | DIN EN ISO 527 | Not measurable | 8.6 | 16.3 | 26.7 | 61.7 | Not measurable |
| Elongation at break [%] | DIN EN ISO 527 | Not measurable | 104 | 85 | 53 | 9 | Not measurable |
| E-modulus [MPa] | DIN EN ISO 527 | Not measurable | 20 | 13.9 | 267 | 1158 | Not measurable |
| Tear resistance [N/mm] | DIN ISO 34-1b B(b) | 2.1 | 6.6 | 24.4 | 51.2 | 19.2 | Not measurable |

TABLE 3b

|  |  | Example 15 | Example 16 | Example 17 | Example 18 | Example 19 |
|---|---|---|---|---|---|---|
| Polyol 1 |  | 79 | 79 | 79 | 79 | 79 |
| GDE1 |  | 21 | 21 | 21 | 21 | 21 |
| ZM1 |  | 0 | 0 | 0 | 0 | 0 |
| Σ A component |  | 100 | 100 | 100 | 100 | 100 |
| Iso 1 |  | 95 | 95 | 95 | 95 | 95 |
| Iso 2 |  | 0 | 0 | 0 | 0 | 0 |
| Kat 1 |  | 5 | 5 | 5 | 5 | 5 |
| Σ B component |  | 100 | 100 | 100 | 100 | 100 |
| Index |  | 50 | 90 | 100 | 150 | 250 |
| Mixing ratio |  | 100:34 | 100:59 | 100:65 | 100:98 | 100:164 |
| hardness | DIN 53505 | 22A | 86D/35A | 92D/44A | 72 D | 75 D |
| Tensile strength [MPa] | DIN EN ISO 527 | Not measurable | 11.2 | 12.7 | 39 | 42 |
| Elongation at break [%] | DIN EN ISO 527 | Not measurable | 80 | 55 | 8 | 3 |
| E-modulus [MPa] | DIN EN ISO 527 | Not measurable | 24.9 | 34.8 | 1085.4 | 1440.5 |
| Tear resistance [N/mm] | DIN ISO 34-1b B(b) | 1.3 | 26.8 | 36.6 | 43.2 | 18.8 |

TABLE 3b-continued

|  | Example 20 | Example 21 | Example 22 | Example 23 | Example 24 | Example 25 | Example 26 |
|---|---|---|---|---|---|---|---|
| Polyol 1 | 77 | 77 | 77 | 77 | 77 | 77 | 77 |
| GDE1 | 20 | 20 | 20 | 20 | 20 | 20 | 20 |
| ZM1 | 3 | 3 | 3 | 3 | 3 | 3 | 3 |
| Σ A component | 100 | 100 | 100 | 100 | 100 | 100 | 100 |
| Iso 1 | 0 | 0 | 0 | 0 | 0 | 0 | 0 |
| Iso 2 | 99.5 | 99.5 | 99.5 | 99.5 | 99.5 | 99.5 | 99.5 |
| Kat 1 | 0.5 | 0.5 | 0.5 | 0.5 | 0.5 | 0.5 | 0.5 |
| Σ B component | 100 | 100 | 100 | 100 | 100 | 100 | 100 |
| Index | 260 | 365 | 470 | 575 | 680 | 1500 | 1700 |
| Mixing ratio | 100:178 | 100:248 | 100:319 | 100:390 | 100:461 | 100:1018 | 100:1154 |
| hardness | 78 D | 81 D | 82 D | 85 D | 85 D | 85 D | 85 D |
| Tensile strength [MPa] | 43.3 | 56.5 | 69.9 | 76.4 | 80.7 | 6.7 | 7.1 |
| Elongation at break [%] | 7 | 7 | 5 | 5 | 5 | 0 | 0 |
| E-modulus [MPa] | 1535 | 2027 | 2664 | 2997 | 3139 | 2417 | 2619.7 |
| Tear resistance [N/mm] | Not measurable | Not measurable | Not measurable | Not measurable | Not measurable | Not measurable | Not measurable |

Example 27

Lupranat MP 102, Lupranat M10R and a mixture (I) of Araldit GY 250 and a composition (II) were mixed at room temperature and heated to 80° C. for 16 h. Said mixture (I) was applied in an amount of 2 wt.-%, Lupranat MP 102 and Lupranat M10R were applied in 49 wt.-% each.

The ratio of Araldit GY 250 and composition (II) was 2:0.5. Composition (II) was obtained by mixing Lupranat MM103 (200 g), Pluriol A 500 E (800 g) and lithium chloride (17 g).

Reagents:

Lupranat MP 102: Modified 4,4'-diphenyl methane diisocyanate (MDI). The average NCO-functionality is about 2.05.

Lupranat M10R: Solvent-free product on basis of 4,4'-diphenyl methane diisocyanate (MDI) with isomers and oligomers of higher NCO-functionality. The average NCO-functionality is about 2.6. Araldit GY 250: Bisphenol A-epoxy resin.

Lupranat MM103: Carbodiimide-modified 4,4'-diphenyl methane diisocyanate (MDI). The average NCO-functionality is about 2.2.

Pluriol A 500 E: Methyl-endcapped polyethylene glycol with an average molecular weight of 500 g/mol.

The initial viscosity before heating was below 200 mPas at 25° C. A pot life of 3 h was observed at 80° C. No curing occurred below 50° C. After 3 h at 80° C. curing started with practically no foaming.

Figure 1A:
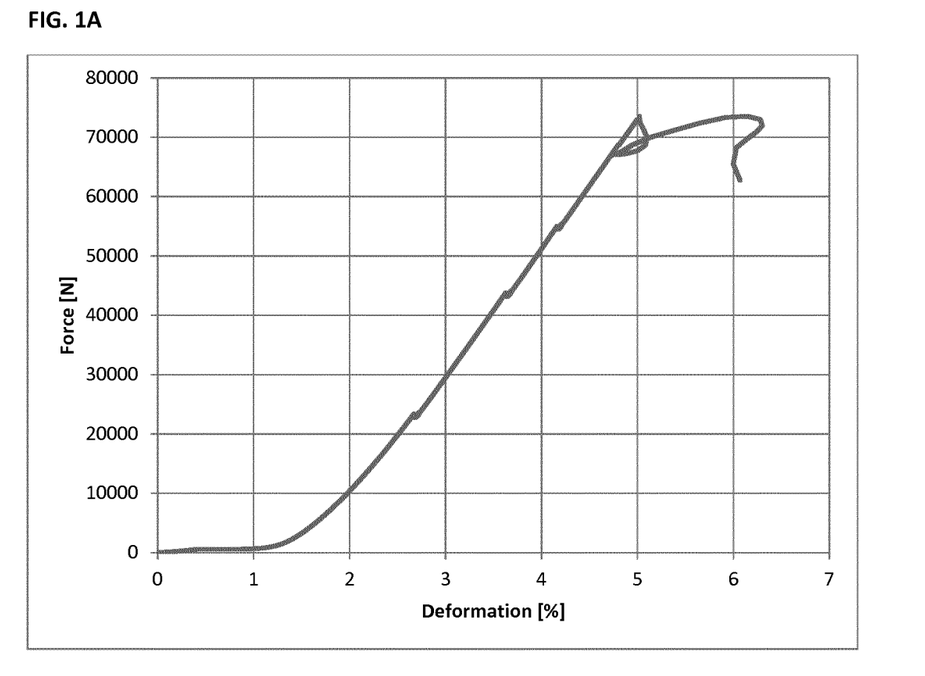
FIG. 1A) shows a diagram, wherein the compressive force applied to the material obtained in Example 27 and the resulting deformation are correlated.
Figure 2A:
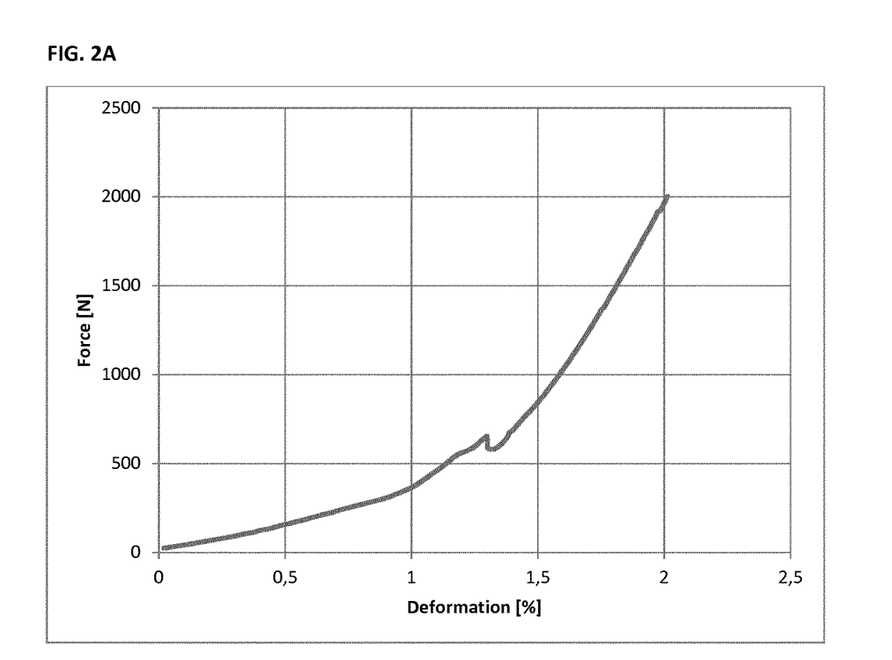
FIG. 2A) shows a diagram, wherein the bending force applied to the material obtained in Example 27 and the resulting deformation are correlated.

Example 27 offered a bending strength of 5 MPa and a compressive strength of 51 MPa. A prism of 4×4×16 cm was used for the determination of the bending strength, a 4×4×4 cube was used for the determination of the compressive strength. For a graphical illustration of the compressive force experiment see FIG. 1A). For a graphical illustration of the bending force experiment see FIG. 2A)

The material of Example 27 is therefore suitable for stabilizing geological material in boreholes, where the temperature is about 80 to 100° C.

Example 27a

During the preparation of Example 27 an additional amount of BaSO$_4$ (25% based on the total weight of the composition) was added. After heating to 80° C. for 16 h Example 27a provided a bending strength of 26 N/mm$^2$ and a compressive strength of 89 N/mm$^2$.

Example 28

Lupranat MP 102 and a mixture (I) of Araldit GY 250 and a composition (II) were mixed at room temperature and heated to 80° C. for 16 h. Said mixture (I) was applied in an amount of 2 wt.-%, Lupranat MP 102 was applied in 98 wt.-%. The ratio of Araldit GY 250 and composition (II) was 2:0.5. Composition (II) was obtained by mixing Lupranat MM103 (200 g), Pluriol A 500 E (800 g) and lithium chloride (17 g).

Figure 1B:
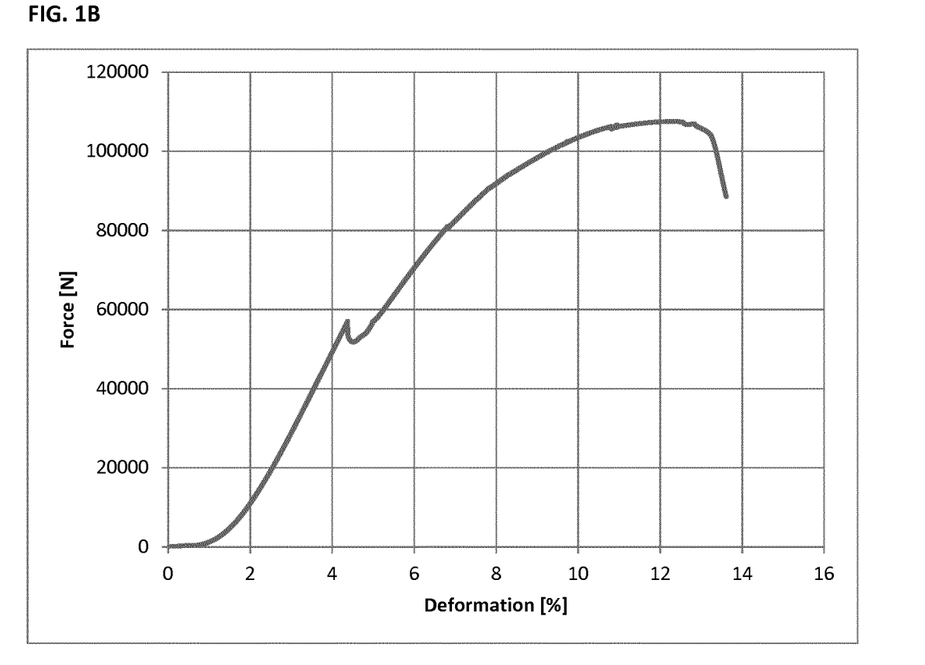
FIG. 1B) shows a diagram, wherein the compressive force applied to the material obtained in Example 28 and the resulting deformation are correlated.
Figure 2B:
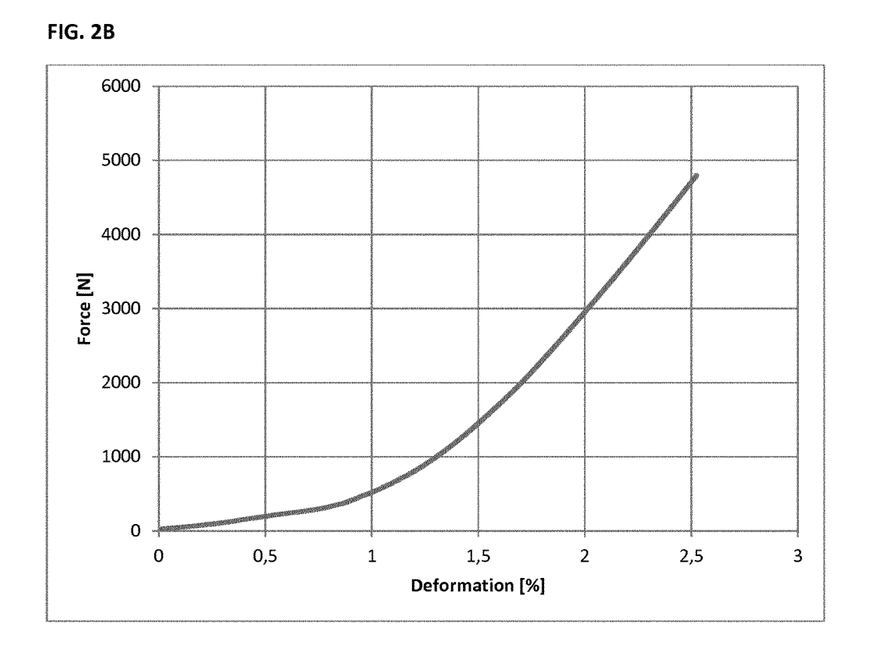
FIG. 2B) shows a diagram, wherein the bending force applied to the material obtained in Example 28 and the resulting deformation are correlated.

The initial viscosity before heating was below 200 mPas at 25° C. A pot life of more than 3 h was observed at 80° C. No curing occurred below 50° C. Example 28 offered a bending strength of 16 MPa and a compressive strength of 100 MPa. A prism of 4×4×16 cm was used for the determination of the bending strength, a 4×4×4 cube was used for the determination of the compressive strength. For a graphical illustration of the compressive force experiment, see FIG. 1B). For a graphical illustration of the bending force experiment, see FIG. 2B).

The material of Example 28 is therefore suitable for stabilizing geological material in boreholes, where the temperature is about 80 to 100° C.

Example 28 further provided adhesion values to marble of greater than 3.2 N/mm$^2$ and to concrete of 5.5 N/mm$^2$.

Example 28a

During the preparation of Example 28 an additional amount of BaSO$_4$ (25% based on the total weight of the composition) was added. After heating to 80° C. for 16 h Example 28a provided a bending strength of 34 N/mm$^2$ and a compressive strength of 84 N/mm$^2$.

Example 28b

During the preparation of Example 28 an additional amount of BaSO$_4$ (50% based on the total weight of the composition) was added. After heating to 80° C. for 16 h Example 28b provided a bending strength of 19 N/mm² and a compressive strength of 34 N/mm².

Example 29

Lupranat MP 102 (87.75 g), Lupranat M10R (87.75 g) and a mixture (I) of Araldit GY 250 (7 g) and a composition (II) (7 g) were mixed at room temperature. Composition (II) was obtained by mixing Lupranat MM103 (200 g), Pluriol A 500 E (800 g) and lithium chloride (17 g). After a short mixing period BaSO₄ (API grade, 164.5 g) was admixed and the material was cured at 80° C. for 16 h.

The material of Example 3 is suitable for stabilizing geological material in boreholes, where the temperature is about 80 to 100° C.

Comparative Example 1

Example 27 was repeated using DBU (1,8-diazabicyclo [5.4.0]undec-7-ene) instead of composition (II). With this catalyst no curing at 80° C. could be observed. Rather, the temperature had to be increased to 150° C. to achieve curing. Moreover, curing occurred with undesired foaming.

Comparative Example 2

Example 27 was repeated using a polyisocyanate composition comprising a polyisocyanate, lithium chloride and an urea compound (Vitrox catalyst of Huntsman Corp., WO 2010/121898) instead of composition (II). With this catalyst slow curing was observed after 300 min. at 80° C. with undesired foaming.

The invention claimed is:

1. A method for stabilizing a geological formation in oil fields or gas fields, which comprises providing a composition, introducing the composition into the formation and allowing the composition to cure; wherein the composition comprises
    (a) a polyisocyanate,
    (b) a mixture obtained by mixing a salt selected from an alkali metal halide, cyanide, nitrate, sulfate, hydrogen sulfate, sulfite, hydrogen sulfite, carbonate, hydrogen carbonate, phosphate, hydrogen phosphate, dihydrogen phosphate, carboxylate, sulfonate, or amidosulfonate or from an alkaline earth metal halide, hydrogen sulfate, or nitrate, with a compound obtained by reacting a polyisocyanate (a1) with a compound having one or more hydroxy groups and
    (c) an epoxy group containing compound;
    wherein the composition is a composition for stabilizing a geological formation in oil fields gas fields;
    wherein the amount of the components (b) and (c) together is 0.1 to 15 wt. %, based on the total weight of components (a) to (c) of the composition; and
    wherein the composition has a hardening temperature of 40 to 150° C.; and
    wherein the composition provides an open time of more than 60 min,
    wherein open time is defined as a time range, beginning with the mixing of the components to the time when the viscosity of the mixture has increased to a value, high enough to exceed the power of a Shyodu Gel Timer stirrer, Type 100, Version 2012.

2. The method according to claim 1 wherein the composition is a composition for stabilizing an oil well or a gas well.

3. The method according to claim 1, wherein the amount of the components (b) and (c) together is 0.1 to 3 wt. %, based on the total weight of components (a) to (c) of the composition.

4. The method according to claim 1, wherein the composition additionally comprises a compound (d) selected from the group consisting of monools, polyols, alkoxylated monools and alkoxylated polyols, wherein compound (d) is different from the compound having one or more hydroxy groups used in step (b).

5. The method according to claim 1, wherein polyisocyanate (a1) is reacted with the compound having one hydroxy group.

6. The method according to claim 1, wherein the compound having one or more hydroxy groups is used in a stoichiometric amount or in a stoichiometric excess.

7. The method according to claim 1, wherein the composition is essentially free of polyols.

8. The method according to claim 1, wherein polyisocyanate (a1) is selected from the group consisting of diphenyl methane diisocyanate, polymeric diphenyl methane diisocyanate, tolylene diisocyanate, hexamethylene diisocyanate, isophorone diisocyanate, tetramethylxylylene diisocyanate, methylcyclohexane diisocyanate, isomers, homologs, prepolymers and mixtures thereof.

9. The method according to claim 1, wherein polyisocyanate (a) and polyisocyanate (a1) are the same.

10. The method according to claim 1, wherein compound (c) contains one or more epoxy groups per molecule.

11. The method according to claim 1, wherein the salt is an alkali metal halide.

12. The method according to claim 1, wherein the equivalent ratio of epoxy groups to isocyanate groups in the composition is from 0.1 to 2.0.

13. The method according to claim 1, wherein the composition additionally comprises one or more additives, selected from the group consisting of chain extenders, cross linkers, fillers, additives for water adsorption, weighting agents and flame retardants.

14. The method according to claim 13, wherein the weighting agent is barium sulfate.

15. The method according to claim 1, wherein the composition is in the form of a kit-of-parts, wherein component (a) is contained in a first part and components (b) and (c) together are contained in a second part or each of the components (a), (b) and (c) is contained in a separate part.

16. The method according to claim 1, wherein the composition is introduced into the formation by pumping or injecting.

17. The method according to claim 1, wherein the composition further comprises a weighting agent.

18. The method according to claim 1, wherein the amount of the components (b) and (c) together is 1 to 2 wt. %, based on the total weight of components (a) to (c) of the composition.

19. The method according to claim 1, wherein the amount of the components (b) and (c) together is 5 to 13 wt. %, based on the total weight of components (a) to (c) of the composition.

20. A method for stabilizing a geological formation in oil fields or gas fields, which comprises providing a composition, introducing the composition into the formation and allowing the composition to cure; the composition comprising
    (a) a polyisocyanate,
    (b) a mixture obtained by mixing a salt selected from an alkali metal halide, cyanide, nitrate, sulfate, hydrogen sulfate, sulfite, hydrogen sulfite, carbonate, hydrogen carbonate, phosphate, hydrogen phosphate, dihydrogen phosphate, carboxylate, sulfonate, or amidosulfonate or from an alkaline earth metal halide, hydrogen sulfate, or nitrate, with a compound obtained by reacting 50 to 150 mol %, of polyisocyanate (a1) with an alcohol having one hydroxy group, and (c) an epoxy group containing compound, wherein the mixture is essentially free of polyols;

wherein the amount of the components (b) and (c) together is 0.1 to 15 wt. %, based on the total weight of components (a) to (c) of the composition;

wherein the composition has a hardening temperature of 40 to 150° C.; and wherein the composition provides an open time of more than 60 min wherein open time is defined as a time range, beginning with the mixing of the components to the time, when the viscosity of the mixture has increased to a value, high enough to exceed the power of a Shyodu Gel Timer stirrer, Type 100, Version 2012.

* * * * *